July 22, 1958 — F. M. HUDSON — 2,844,349
AUTOMATIC WEIGHER WITH DRIBBLE FEED CONTROL
Filed July 12, 1951 — 4 Sheets-Sheet 1

Francis M. Hudson
INVENTOR.

July 22, 1958  F. M. HUDSON  2,844,349
AUTOMATIC WEIGHER WITH DRIBBLE FEED CONTROL
Filed July 12, 1951  4 Sheets-Sheet 2
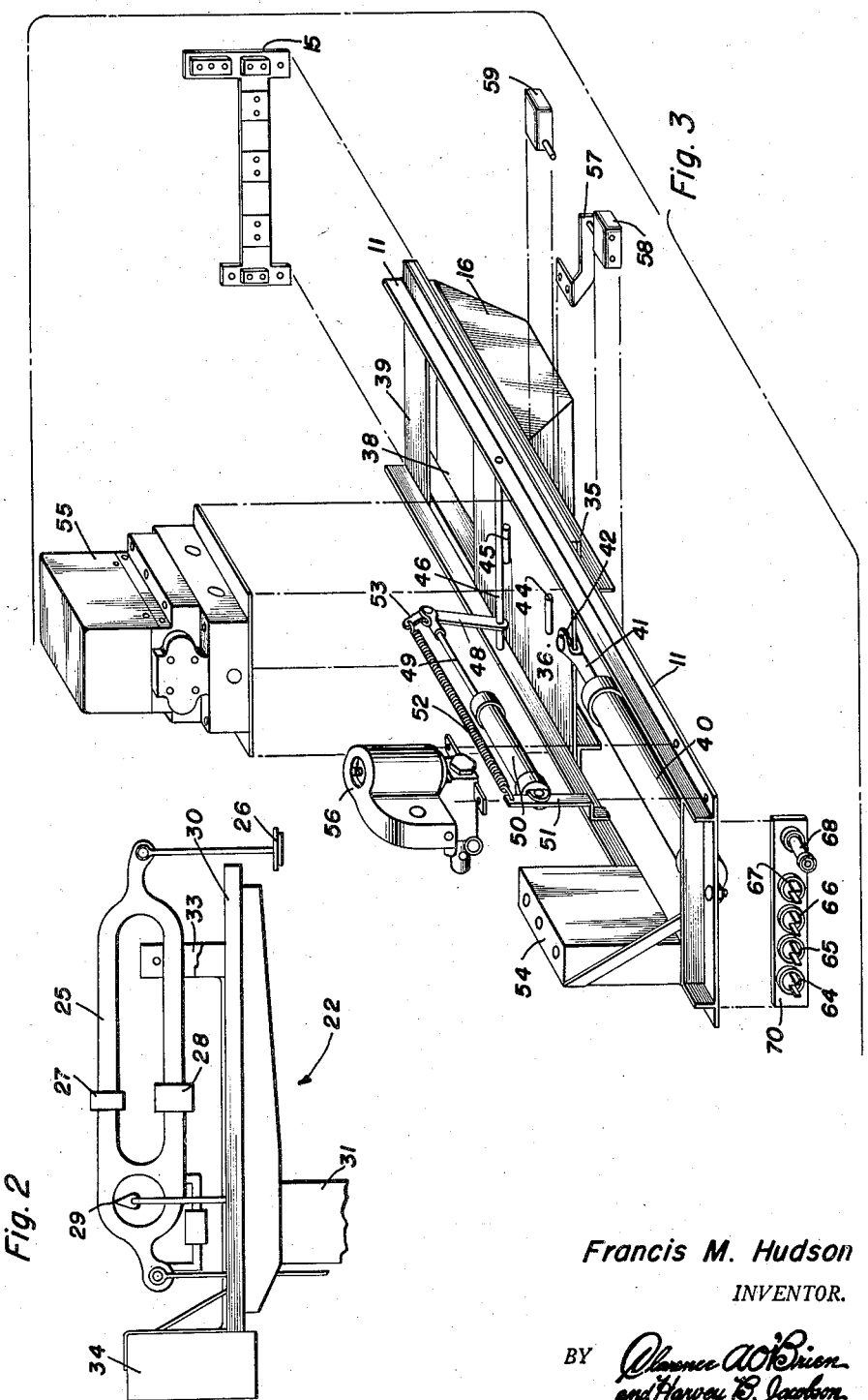
Francis M. Hudson
INVENTOR.

July 22, 1958 F. M. HUDSON 2,844,349
AUTOMATIC WEIGHER WITH DRIBBLE FEED CONTROL
Filed July 12, 1951 4 Sheets-Sheet 3

Francis M. Hudson
INVENTOR.

BY *Clarence A. O'Brien*
and *Harvey B. Jacobson*
Attorneys

Francis M. Hudson
INVENTOR.

BY *Clarence A. O'Brien*
*and Harvey B. Jacobson*
Attorneys

United States Patent Office 2,844,349
Patented July 22, 1958

2,844,349

AUTOMATIC WEIGHER WITH DRIBBLE FEED CONTROL

Francis M. Hudson, Filer, Idaho, assignor to Associated Seed Growers, Inc., New Haven, Conn., a corporation of Idaho Application July 12, 1951, Serial No. 236,349

7 Claims. (Cl. 249—63)

This invention relates to automatic weighing mechanisms cooperating with filling apparatus for automatically determining the quantity or weight of a material flowing from the discharge gate of a bin or from a hopper into containers, bags, sacks or other receptacles by gravity and for shutting off the flow of material when the weight or quantity has reached a predetermined value.

It is a main object of this invention to provide an automatic mechanism of the above mentioned type adapted to cooperate with or to be added to standard units, but which provides consistently a high accuracy of weighing, which is small and compact and may be built at relatively low cost and which does not have expensive or intricate wearing parts.

In weighing out apparatus the main problem is that of providing a relatively simple and inexpensive equipment which operates with high precision, producing a high accuracy in the weighing out operation which must be consistently maintained during a continuous operation lasting for an indefinite time. Constructions hitherto deemed necessary to obtain high precision are in most cases too complex or too expensive for ordinary long time operation. They wear out rapidly under load and their supervision and maintenance require specially trained personnel.

The conventional weighing out apparatus lacks accuracy and falls short of the requirements. If seeds or manufactured material consisting of small units or particles are to be filled into containers which are directly marketed after having been filled, it is essential that the weight indicated on the container be guaranteed and that containers filled with less than the guaranteed weight be excluded. This either requires a subsequent checking of the weight or some kind of testing operation or an adjustment of the arrangement in which the variations in weight are all on the positive side or, otherwise expressed, in which the guaranteed weight is the greatest possible deviation from the weight to which the apparatus is adjusted. Therefore the weighing out apparatus must be adjusted for a mean weight which is higher than the guaranteed weight and the difference between the higher weight and the guaranteed weight increases with the increase of the possible deviation and therefore with the decrease of the weighing accuracy. It will therefore be clear that this difference between the actual adjustment and the guaranteed weight is a permanent source of loss, as the means or average weight of the goods filled into the container is clearly higher than the weight actually paid for.

It follows that an automatic weighing and filling apparatus of high precision is essential in all cases in which the above mentioned loss represents a sizable value in order to reduce the excess weight which has to be filled into the container to be certain that the container is filled with material having the weight indicated on the label.

While scales with any degree of precision have been built, it is usually not advisable to combine them with machinery having heavily loaded elements or parts which require much power to operate them. There is for instance necessarily a variable time lag between the starting of the shutting off operation of the flow of material by the scale and the completion of the shutting off operation. As a variable quantity of material flows to the containers during this interval, it is inevitable that a relatively high percentage of inaccuracy is introduced in this way, whatever the accuracy of the scale, which adds itself to other inaccuracies of the operating machinery. The above mentioned inaccuracy will increase with the quantity of material flowing to the containers to be filled per time unit. If, to obtain a higher accuracy, the quantity of material flowing to the container per time unit is reduced the process of filling is lengthened to such an extent that the performance of the apparatus does no longer answer the requirements and materially increases the cost of the weighing and filling operation.

The invention has for its principal object to solve the problem of high accuracy of the weighing out operation performed in connection with a rapid flow of the material to be filled into containers. For this purpose not only accurate scales and photoelectric operating means in connection with the scale are used, but apparatus are provided capable of performing the shutting operation in a plurality of phases or stages in which the extent or degree to which the flow is shut off decreases, and further capable of slam shutting the movable shutting member controlling the flow of material in the last phase or stage. The initiation of the various phases and the shutting operation are controlled by a single weighing scale. During the first weighing stage or phase filling of the containers proceeds rapidly and weighing is approximate only. As soon as the approximate weighing process shows that the predetermined weight is about to be reached, a partial shutting of the shutting member slows down the filling operation and an accurately functioning weighing scale mechanism determine the exact weight and produces slam shutting of the already partially closed shutting member. The entire weighing operation in at least two phases or stages is performed according to the invention by means of a single weighing out apparatus operating the shutting member at high speed which apparatus comprises units which are partly built into any existing platform scale suitable for weighing the containers to be filled and are partly attached to or inserted into existing hoppers or bin gates. On account of the small weight of these flow control units the apparatus is practically portable which is a main advantage for apparatus of this type and which makes it possible to use such apparatus on farms.

The more specific objects of the invention will be explained in the following detailed specification.

The following specification describes and the drawings illustrate one embodiment of the invention by way of example. But it is to be understood that the example which has been shown in the accompanying drawings has been selected in order to explain the principle of the invention and the best mode of applying said principle. It will be obvious to the experts skilled in the art when perusing the specification that many of the constructions and units shown may be replaced by others without changing the cooperation between these constructions and units and a departure from the example shown is therefore not necessarily a departure from the principle of the invention.

In the drawings:

Figure 2 is a side view of the upper part of a weighing scale illustrating the additions necessary for a photo-electric control.

Figure 3 is an exploded perspective view of that portion of the apparatus which is attached to the hopper or bin.

Figure 1:
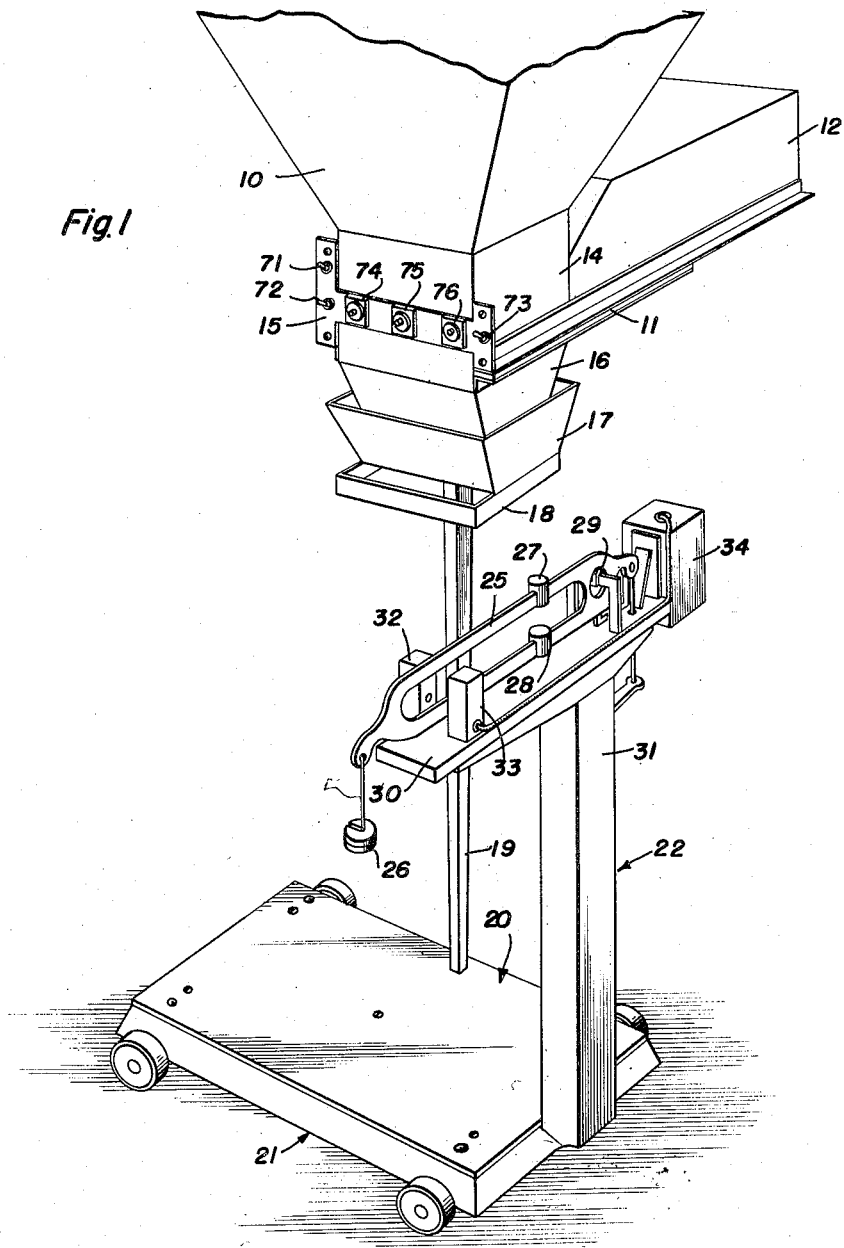
Figure 1 is an isometric view of the entire arrangement showing an existing filling hopper and a scale each provided with the additional apparatus according to the invention.
Figure 4:
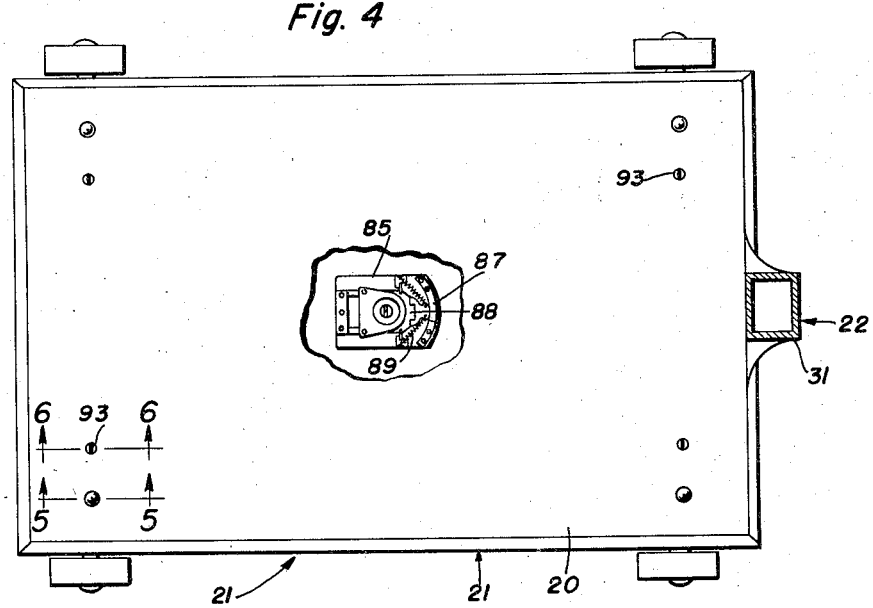
Figure 4 is a top view of the platform of the weighing scale.

The automatic weighing apparatus according to the invention is a portable unit which may operate in conjunction with any beam scale provided with a platform and which is primarily built for precision and for a consistently accurate weighing of material of any kind capable of running into containers in a more or less continuous flow. It may, for instance, be used for sacking grain, peas, beans or other seeds fed from an overhead hopper or bin. The portable automatic flow control unit may be directly attached to the bin or hopper and to the scale and platform respectively, the latter being a standard one-bag platform scale.

The performance of the automatic weighing unit may be summarized by stating that it consists of a flow control unit, the actuated shutting member of which is a slide controlling the opening leading from the hopper or bin discharge gate to the container to be filled. The operating mechanism for the slide includes electrically controlled air valves admitting air to two cylinders, one of them operating the slide itself and the other operating a limiting stop to be placed into the path of the slide, and permitting a closure of the slide to a certain point where the opening through which the goods or seeds flow is materially reduced in area and the flow of the goods is slowed down to a trickle. This slowing down of the flow occurs when, during the filling operation, the predetermined weight of the goods to be filled into a container has nearly been reached so that the weight of the goods delivered into the container differs from the correct weight only to a certain limited predetermined extent. The small trickle of goods which continues to flow into the container can be more easily controlled than the normal flow and is not capable of producing marked differences of weight especially when shutting off occurs rapidly. Complete shutting off is therefore initiated in the moment in which the scale actually balances.

The slide controlling the flow of goods is, in its turn, controlled by electrically operated air valves, the operation of which must be initiated when the weight of the container placed on the scale reaches the above named value which is still below the correct value to be filled into the container but which is sufficiently close to the latter. This initial operation reduces the flow of goods to a trickle, as above described and, when the correct weight of the goods filled into the containers has been reached and the scale is balanced a further operation of the air valves is initiated by the scale which now results in a complete closure of the opening through which the goods flow. The air valves are operated by solenoids controlled by switches which are operated by the scale. One of said air valves limits the movement of the slide shutting off the goods, while the other air valve operates the slide.

The switches operated by the scale are of two kinds. One type of switches is operated by an auxiliary platform mounted on the platform of the scale which auxiliary platform forms a kind of spring balance for determining the weight at which the flow has to be cut down to a trickle. The operation of the switch or switches on the platform results in the operation of both air valves, one of them bringing the limiting stop for the slide plate into its operative position and the other air valve operating the slide. The remainder of the operation is controlled by a photo-electric scale balance indicator which cooperates with a relay switch controlling the solenoid of the air valve which controls the limiting stop. The removal of the limiting stop in the moment at which the scale is balanced therefore determines the moment of complete closure of the slide. The closure occurs at considerable speed and as merely the small opening which remains after the first closure movement has to be closed the time lag and therefore the deviation from the true and correct weight to be filled into the containers is negligible.

It is to be understood that most of the units which are used are standard products of manufacturers and that their specific construction is immaterial for the invention. These units are only described to such an extent that the result obtained and the cooperation between the units may be fully understood.

The general arrangement of the flow control unit is seen in Figure 1 of the drawings. The feeding hopper 10 carries the main frame 11 on which the slide controlling the flow of goods and its operating mechanism is mounted. This mechanism is contained within the housing 12 and will be described below in detail. The end of the main frame which is visible in Figure 1 carries the switchboard 15 on which the various hand operated switches are mounted. This end is hereinafter termed the front end. The feeding hopper 10 ends in a chute 16 delivering the goods into a receiving hopper 17, mounted on a second frame 18 which holds the upper portion of the container (if of pliable material) or which is placed on or over the container opening, if the latter is rigid. The receiving hopper 17 and receiving hopper frame 18 is carried by a post or column 19 mounted on the carriage 21 of the weighing scale which is generally indicated at 22.

The weighing scale comprises the weighing beam 25 (Figures 1 and 2) suspended on a knife edge 29 which is mounted on the beam support 30 carried by the hollow upright 31 projecting from the carriage 21. At the end of the beam 25 a fixed weight 26 is suspended and the two parallel arms of the beam 25 moreover carry the slidable weights 27, 28 which are adjusted in order to determine the weight of the goods to be filled into the containers.

The beam 25 of a weighing scale is connected with the scale platform assembly mounted on the carriage 21 in the conventional manner which is not shown in the figures. The scale platform assembly consists of a main platform 80 which supports, by means described below, a second auxiliary platform 20 on which the bags or other containers rest while their upper ends are attached to or project into the vicinity of the receiving hopper frame 18.

On the beam support 30 the photo-electric indicator 32, 33, 34 is mounted which is of a well known construction. It consists of three units, two of which, 32 and 33, contain the exciter lamp and the photo-electric cell, respectively, which are facing each other and which are located on opposite sides of one of the arms of the beam 25. The light rays passing from the exciter lamp to the photo-electric cell are intercepted when the beam is balanced, so that an impulse is produced when the beam moves into the position of balance. The third unit 34 contains an amplifier and a relay switch of conventional construction, the latter being operated when the ray of the exciter lamp is intercepted by the beam.

The front side of the frame 11 is turned towards the rear in Figure 3 for better illustration.

On the underside of the main frame 11 a guide frame 35 is attached and between the two frames pockets or slots are formed within which the marginal portions of the slide 36 are guided. At the front end of the main frame 11 (which front end is shown in the rear of Figure 3) the chute 16 is attached to the guide frame 35. This chute is located directly beneath the lower portion of the feeding hopper 10 which is however not illustrated in Figure 3. At the end of the main frame 11 an abutment plate 39 may be mounted against which the edge of the slide 36 abuts when the latter is closed, thus shutting off completely access to the entrance opening 38 of the chute 16 through which the goods or seeds are delivered to the receiving hopper 17.

The slide 36 is moved by a piston 41 attached to it at 42 which is reciprocated within an air cylinder 40 into which air under pressure may be admitted at both ends alternatively, in order to move the piston and slide 36 towards or away from the abutment plate 39. The admission of air is regulated by means of a conventional slide valve distributor, one of said conventional distributors being diagrammatically indicated in Figure 7. The slide 36 carries a stop member 44 fixed to it which cooperates with a second movable stop member 45 attached to the transverse rocking shaft 46 which is journaled in aligned bores of the main frame 11 and which may be rocked by means of the rocker arm 48. The rocking shaft 46 is so held within the slide that, when rocked in one direction, it brings the movable stop member 45 to the path of the stop member 44, and when rocked in the other direction, it removes the movable stop member 45 by swinging it upwardly thus permitting the free passage of the stop member 44 and of the slide 36.

The rocker arm 48 is operated by means of piston rod 49 which is attached to a piston reciprocating within the pneumatic cylinder 50. The air under pressure is admitted to the rear portion of the pneumatic cylinder 50 only so that, when air is admitted, the piston and piston rod 49 moves forward and the rocker arm 48 is rocked towards the rear in Figure 3. The rocking of the rocking shaft 46 as already mentioned lifts the stop member 45, permitting free passage of stop member 44.

The pneumatic cylinder 50 is held on a support 51 on main frame 11, to which support the end of a coil spring 52 is attached, the other end of the spring being attached to an extension 53 of the rocker arm 48. This spring is tensioned when the piston is moved outwardly within the pneumatic cylinder 50 and it returns the piston and the rocker arm 48 attached to it to its position of rest when the air pressure ceases.

The admission of air under pressure to the air cylinder 40 is controlled by the three-way air valve 55 which is solenoid operated and which is of a conventional construction. The three-way air valve contains a distributing valve member which is adapted to connect the compressed air line alternatively with either of the two outlets leading to the pipes 102 and 104 respectively. The valve contains two solenoids, indicated diagrammatically at 61, 62 in Figure 7, which move a distributing member, thus supplying compressed air either to one end or to the other end of the cylinder 50.

The three-way air valve 55 is mounted on the main frame 11, as indicated by the lines in dots and dashes in Figure 3.

A further two-way air valve 56 which is also solenoid controlled is the controlling element of pneumatic cylinder 50. This unit is of a conventional construction and is controlled by a single solenoid (63, Figure 7) adapted to move a distributing member which connects the single supply line of the pneumatic cylinder 50 leading to the rear of the said cylinder either with the pressure line or with an exhaust opening.

The slide 36 is provided with an actuator member 57 which operates two limit switches 58, 59 which may be of the micro-switch type and which are so mounted on the main frame 11 that they are operated when the slide 36 reaches its end positions. The two limit switches 58 and 59 control circuits which are described below.

On the rear end of the main frame 11 a connector plate 70 provided with a number of plugs 64, 65, 66, 67 is mounted. Plug 64 is connected with the usual power supply line. Plug 65 supplies power to the units of the photo-electric indicator and the relay switch which forms part of the same, plug 66 is connected with the switches on the platform of the scale which are described below and plug 67 makes connection between the relay switch of the photo-electric unit and the circuits controlling the air valves. The connection for the compressed air supplying the air valves is indicated at 68.

On the front end of the main frame 11 the switchboard 15 is arranged carrying the hand operated switches 71 to 76. The switches 71, 72 and 73 are toggle switches or similar switches which after operation retain their position, while switches 74 to 76 are push button switches or similar switches returning to their original positions after operation.

Figure 5:
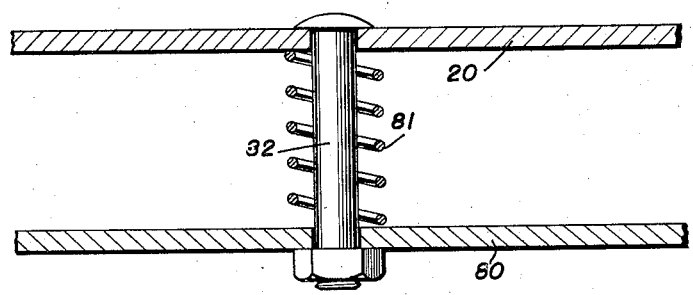
Figure 5 is a sectional elevational view of the manner in which an auxiliary platform is supported on the platform of the weighing scale, the figure showing a detail and a section being taken along line 5—5 of Figure 4.
Figure 6:
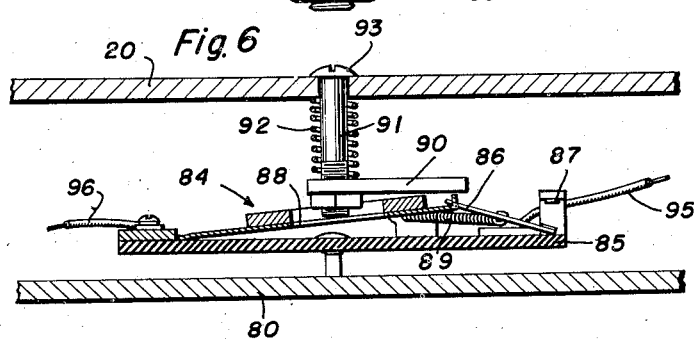
Figure 6 is a detailed sectional elevational view of the platform of a weighing scale and of the auxiliary platform and of the switches inserted between the two platforms, the section being taken along line 6—6 of Figure 4.

The containers, sacks or bags to be filled are placed on the scale platform which is a composite assembly consisting of the main scale platform 80 forming a main or lower platform upon which the upper auxiliary platform 20 is mounted. The lower platform 80 is a conventional scale platform mounted on the carriage 21 in the usual way and connected with the links and connecting rods attached to the scale beam. As already mentioned the scale construction in all its details is well known and need not be described. According to the invention merely the upper, auxiliary platform 20 is added which is carried by the lower platform 80 by means of springs 81 and bolts 82 (Figure 5). Any weight placed on the upper platform 20 will therefore compress the spring 81 and somewhat lower the upper platform.

Between the two platforms at several spots (five being indicated in the drawings) the lower platform 80 carries switch plates 85 of insulating material, each forming the base of a switch 84 which is preferably of the snap switch type. Such a snap switch 84 is provided with a contact member 86 hinged to an actuating member 88. The contact member 86 is moved into contact with a second contact member 87 when a pressure is exerted on the actuating member 88 moving the latter over a predetermined distance. This result is usually obtained by means of a lever system, or by means of a coil spring 89 which is inserted between the members 86 and 88. The actuating member 88 is fixed at one end and is preferably an elastic member. When the actuating member 88 is pressed down, the coil spring 89 is tensioned up to the point when members 86 and 88 are substantially aligned, the member 86 resting with its free end on the switch plate 85. Upon further pressure the coil spring 89 which has been tensioned during this process may again contract thereby throwing member 86 upwardly into contact with contact 87.

Pressure is exerted on the actuating member 88 by an arm 90 engaging an upwardly turned end of the actuating member 88. The arm is held on a bolt 91 which is mounted on the upper auxiliary platform 20 and which is preferably held by a spring 92. When the weight supported by the upper or auxiliary platform 20 increases, the springs 82 are compressed and the arm 90 exercises an elastic pressure, controlled by spring 92, on the actuating member. The arrangement is therefore similar to that of a spring balance carried by the scale platform. It will however be observed that the operation of the scale is not in any way affected by the movement imparted to the auxiliary, upper platform. Neither does the operation of the switches interfere with the weighing operation and the weight put on the upper platform will always register on the scale as it is transmitted to the lower platform 80 which is linked to the beam.

When the weight on the spring carried upper platform 20 therefore reaches a certain limit several or all of the switches 84 will snap into their contact position. This operation of the snap switches as above explained, moves the slide 36 to the position in which the flow of goods is reduced to a trickle which fills the container at a slow rate. The further operation is then controlled by the photo-electric control mechanism.

Figure 7:
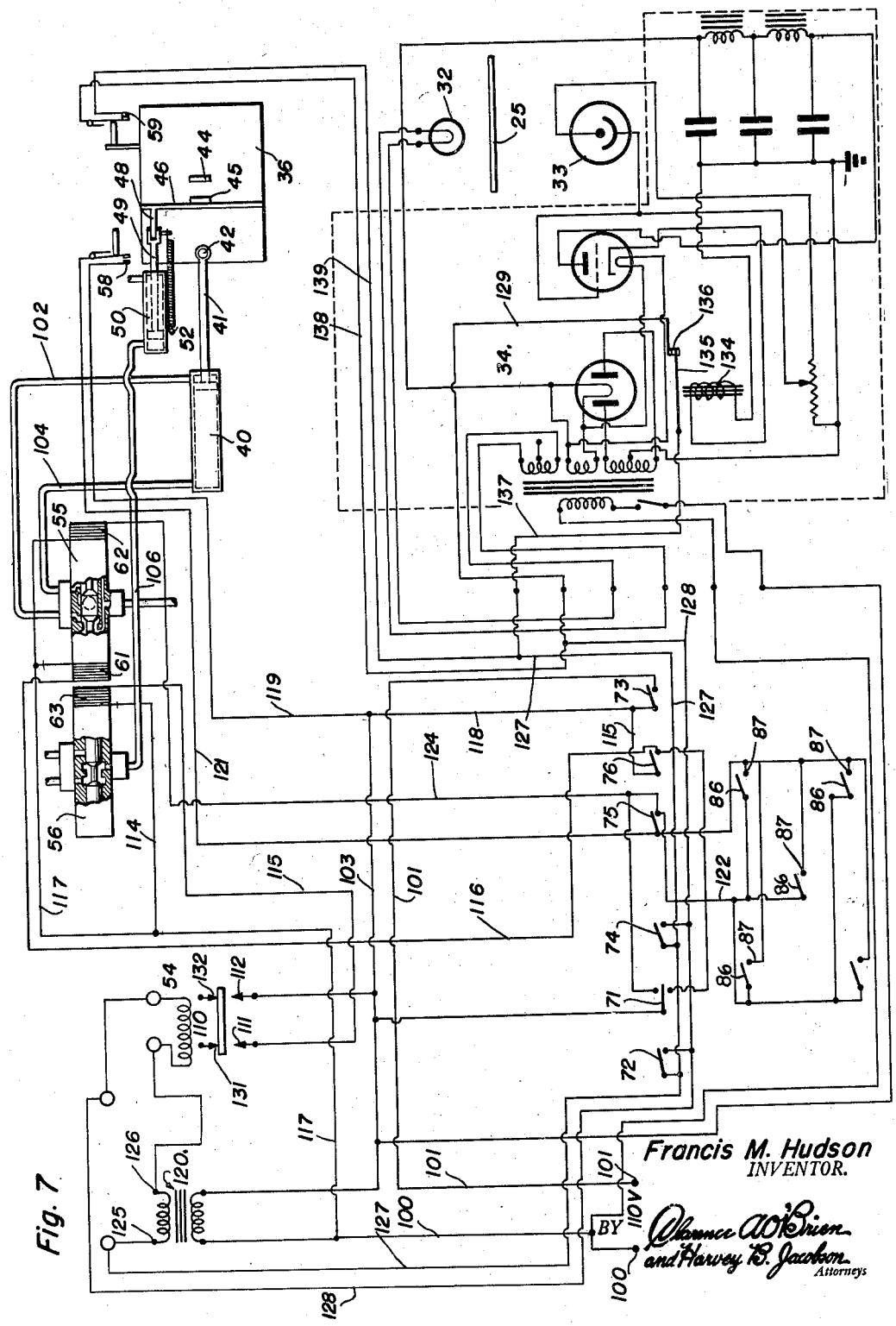
Figure 7 is a diagram of the connections between the units.

The electrical connections and the cooperation between the parts which have been above described will best be understood by describing a cycle of operation, having reference to Figure 7 which shows the outlay of the system and the connections between the unit.

Let is therefore be assumed that the container is placed on the upper platform 20 with its upper portion (if in the shape of a bag or sack) held by the receiving hopper frame 18 while the goods such as seeds to be filled into the container, have been filled into the bin or feeding hopper 10. All connections must have been made by inserting the suitable cable connections and air line connections at the proper places. It may further be assumed that the slide 36 is closed, that the feeding hopper 10 is filled and that the operation is about to start.

The operator then throws master switch 73 into its operative position and presses shortly button switch 76. Thereby the solenoid 61 of the three-way air valve 55 is operated over a circuit starting from supply line 101 which includes switch 73, conductor 115, push button switch 76, line 116, solenoid 61, and return line 117 leading to the second supply line 100. The operation of solenoid 61 throws the valve distributor into such a position that the compressed air will enter air line 102. Therefore the piston 41 is moved towards the left in Figure 7 and the slide 36 is also moved towards the left, thus uncovering completely the entrance opening 38 of chute 16. Upon release of button 76 the solenoid 61 is again deenergized, but the distributor valve remains in its position and therefore also the piston 41 remains in the position into which it was brought.

When the slide 36 reaches its open position the limit switch 58 is closed while the limit switch 59 is opened. The opening of limit switch 59 opens the circuit, described below, including the regulator relay 54 which is mounted on the rear end of the frame 11 (Figure 2) and which is provided with an armature 110 which controls the operation of the two-way air valve 56. When the armature 110 of the relay 54 falls back on contacts 111 and 112, it closes the circuit of solenoid 63 of the two-way air valve 56. This circuit may be traced from supply line 101 over master switch 73, conductors 118 and 103, contacts 112 and 111 (bridged by armature 110 in its position of rest) and over conductor 115, solenoid 63, return lines 114 and 117 to supply line 100. The valve 56 therefore is operated and air under pressure is admitted into the rear of the cylinder 50. Piston and piston rod 49 are moved towards the right in Figure 7 rotating rocking shaft 46 and bringing the stop member 45 into its operative position.

The goods or seeds are now flowing in a steady stream into the container (not shown) which is placed on the scale platform. This stream of goods or seeds fills the entire area of opening 38. The weight of the container filled with the seeds or goods will now steadily increase and the beam 25 of the scale with the counterbalancing weights 26, 27 and 28 will be raised while the springs 81 (Figure 5) will be compressed. Shortly before a quantity of goods having the desired weight has been filled into the container, say when about 90% of the full weight with which the container has to be filled is reached, the springs 81 are compressed to such an extent that the arm 90 presses the actuating member 88 of switch 84 downwardly and brings the actuating member 88 in line with member 86, tensioning spring 89 to its maximum extent. Any further increase in the weight therefore causes the spring 89 to initiate the snap action of the switch and to bring members 86 and 87 into contact. As soon as contact in one of the switches 84 or in a plurality of switches occurs the circuit over the solenoid 62 of the three-way air valve 55 is closed which runs from supply line 101 over master switch 73, conductors 118, 119 to the limit switch 58 (now closed) to line 121 over one or over a plurality of the contacts 86, 87 of the closed switches 84, conductor 122, line 124, solenoid 62 of the three-way air valve 55 and over return line 117 back to supply line 100. The solenoid 62 of the three-way air valve now operates the distributing valve member of the said air valve and moves it to the position in which the compressed air is admitted to the pipe line 104. Thereby piston 41 in cylinder 40 is moved towards the right in Figure 7 and pushes the slide 36 also towards the right in this figure. However, as the movable stop 45 has been moved into the path of stop member 44 the slide 36 cannot be moved into its end position, but is stopped in the intermediate position in which a trickle of goods or seeds may still flow into the container, the area open to such flow being however greatly reduced.

The switch 58 has again been opened when the slide was moved from its end position into the intermediate position thus opening the circuit of the solenoid 62 in order to prevent the overheating of the solenoid. However, the distributing member of the three-way air valve 55 remains in its position and therefore air pressure still is active behind the piston 41 in the rear of the cylinder.

The goods or seeds which continue to flow into the container in a trickle bring the weight finally up to the correct preset weight. In this case the scale beam is now moved into its balanced position and thereby intercepts the light ray reaching the photo cell 33. Thereby the relay 134 of the amplifier unit 34 is de-energized and the armature 135 of said relay moves into contact with contact 136; thereby the circuit of relay 54 is closed. This relay operates on a low voltage furnished by a transformer 120 which is connected with the two supply lines 100 and 101. The relay circuit which is closed runs from terminal 126 of the secondary of the transformer 120 over relay 54, line 128, conductor 129, contacts 136, armature 135, conductor 137, line 127, terminal 125 of the secondary of transformer 120. The relay 54 now attracts its armature 110 to open the bridge between contacts 111, 112. This movement of the armature de-energizes solenoid 63 of the two-way air valve 56. Upon de-energization of the solenoid the distributor of the valve 56 automatically connects the line 106 with the exhaust and therefore the cylinder now exhausts through line 106 and the spring 52 moves the arm 48 back into its position of rest. The rocking shaft 46 is thereby rocked and the movable stop 45 is moved out of contact with the stop member 44 on the slide 36. The slide 36 is however still under the influence of piston 41 which is under full air pressure. Therefore the slide 36 slams shut instantly as soon as the impulse is received, closing the opening of the chute 16 completely and interrupting the flow of goods to the containers which took place through the small opening left when the slide was arrested by the stop member 44.

When the slide 36 reaches its fully closed position the limit switch 59 is again closed. This switch closes a shunt 138, 139 to that portion of the circuit which is controlled by the relay armature 135 of relay 134 of the photo-electric indicator mechanism, in order to avoid a repeated operation of the valve 56 and of the cylinder 50 should the scale beam bob up and down.

The operation is now completed.

Should it be desirable to operate the weighing mechanism by hand either on account of failure of the photo-electric equipment or in order to permit a departure from the preset weight in an individual case or for emergency reasons of any kind, the switches 74 and 75 may be used. By means of these switches the air valves 55 and 56 may be operated in the same way in which they are operated by the aforedescribed units.

For a manual operation of the slide plate from its open position to its fully closed position without intermediate position the switches 71 and 72 are used. Switch 72 short circuits the relay 54, thereby cutting out the two-way air valve 56, while switch 71, when moved from one position to the other, actuates the three-way air valve either in one or the other direction.

From the above it will be clear that any beam scale provided with a platform may be equipped with the additional mechanisms and units for service within the aforedescribed automatic weighing apparatus. It will also be clear that the additional equipment, necessary for the purposes of the invention, is relatively small and compact and requires only low initial cost for building it. This equipment is moreover characterized by the absence of expensive and intricate wearing parts.

It will be clearly understood that the units which are used and many of the unessential parts of the equipment may be changed in various ways without departing from the essence of the invention as defined by the annexed claims.

Having described the invention, what is claimed as new is:

1. An automatic weighing apparatus for goods flowing by gravity into bags each bag being filled with a quantity of material having a predetermined weight, provided with a hopper having a delivery opening and a chute delivering the material into the bags to be filled, comprising a weighing scale with a platform assembly including a main and an auxiliary platform, a weighing scale beam provided with a weight counterbalancing the predetermined weight filled into each bag, weight responsive means inserted between the main platform and the auxiliary platform operated by a predetermined weight less than the full weight of the quantity of material filled into each bag, a slide between said hopper and said chute closing the delivery opening, compressed air operated means for moving said slide at high speed across the delivery opening, a movable stop arresting said slide near the end of its movement, electric control means, including a switching means operated by the weight responsive means, controlling the admission of compressed air to the compressed air operated means for moving the slide into a partially closed position, a scale beam operated control means operated by the complete balancing of the scale beam and including a photoelectric cell and a switching means operated by the same, and a further electrically controlled compressed air operated means operated by the last named switching means for removing the movable stop arresting said slide and producing complete closure of the delivery opening.

2. An automatic weighing apparatus for goods flowing by gravity into bags, each bag being filled with a predetermined quantity of material through a hopper with a delivery opening and a delivery chute, comprising a weighing scale platform assembly including a main weighing scale platform and a second auxiliary platform supported by the main weighing scale platform, a scale beam weighted to counterbalance the predetermined weight of a filled bag, weight responsive means inserted between the main weighing scale platform and the auxiliary platform, responsive to a weight less than the full predetermined weight of each bag, a slide adapted to close the delivery opening, compressed air operated means moving said slide at high speed across the delivery opening in two steps, said means including a first cylinder and a first compressed air operated piston moving the slide across the delivery opening, a first solenoid and a first solenoid operated air valve controlling the admission of compressed air to said first cylinder, a second cylinder and compressed air operated piston and a second solenoid and second solenoid operated air valve controlling the admission of compressed air to said second cylinder, a compressed air line leading to the air valves, a removable stop arresting the slide in a first position partially closing the delivery opening and operated by said second piston and cylinder, electric control means, including switching means operated by the weight responsive means inserted between the scale platforms and operating the first solenoid and first solenoid operated air valve, the latter operating the piston in the first cylinder moving the slide, said slide being arrested in the first partial closure position by the removable stop, a scale beam operated control means, operated by the balancing of the scale beam including a photoelectric control and switching means, the latter controlling the second solenoid and second solenoid operated air valve, which controls the second piston removing the removable stop from its operating position thus producing movement of the slide to a second closure position completely closing the delivery opening.

3. An automatic weighing apparatus as claimed in claim 2, comprising in addition a control relay operated by the switching means of the photoelectric control of the scale beam, rest contacts for the same, the said rest contacts being bridged by the armature of the said control relay when de-energized, and a solenoid circuit for the energization of the solenoid of said further compressed air operated piston and cylinder, controlled by the said rest contacts.

4. An automatic weighing apparatus for goods flowing by gravity into bags, each bag filled with material of a predetermined weight delivered through a hopper with a controlled delivery opening and a delivery chute, comprising a flow control unit operating in two steps between said hopper and said bag, said flow control unit including a slide means, means for producing a partial shutting of the delivery opening by said slide means as a first step, further means producing a complete shutting of the delivery opening by said slide means as a second step, a weighing scale with a scale beam weighted to counterbalance the predetermined weight of the filled bag and a platform assembly connected with the scale beam, including a main platform and an auxiliary platform, spaced from and supported by the main platform, resilient weight responsive supporting means between said auxiliary platform and main platform, the load of the bag supported by said auxiliary platform compressing the resilient supporting means, snap switches operated by the resilient weight responsive means when the compression of the resilient weight responsive supporting means exceeds a predetermined value, said means for producing a partial shutting of the delivery opening including a stop member on said slide means and means for moving the slide means, urging the said slide means towards a closing position, electromagnetically controlled operating means for the slide moving means, said electromagnetically controlled operating means being connected with and controlled by the snap switches, a movable stop cooperating with the stop member on the slide, arresting the slide in a position of partial shutting of the delivery opening, forming the first step of operation of the flow control unit, and said further means producing complete shutting of the delivery opening including means for withdrawing said stop, including a solenoid, photoelectric means controlled by the balancing of the scale beam controlling the solenoid which controls the means for withdrawing the arresting movable stop from its operating position, the slide upon withdrawal of the stop being moved by the slide moving means across the delivery opening, shutting off the said opening completely.

5. An automatic weighing apparatus for goods as claimed in claim 4, wherein the auxiliary platform is supported on springs on the main weighing scale platform, wherein the means for moving the slide across the delivery opening are electrically controlled compressed air operated means, and wherein the snap switches, inserted between the auxiliary platform and the weighing scale platform are thrown by a predetermined movement of the auxiliary platform relatively to the main weighing scale platform under the influence of the load placed into a bag, the solenoid means operated by said switches controlling the said compressed air operated means.

6. An automatic weighing apparatus for filling bags with goods until a predetermined weight is reached, said weighing apparatus including a hopper with a delivery opening leading to a bag to be filled, and a weighing scale with a scale beam carrying a counterweight balancing the weight of a filled bag, comprising a flow control unit arranged between said hopper and said delivery opening including a slide, opening and closing the delivery opening, means urging the slide into its extreme closing position including a first electrically controlled compressed air operated means for moving said slide, a stop member on said slide, a movable stop member arresting the slide in a position in which the delivery opening is partially closed and partially open, a second compressed air operated means provided with electric control means, moving the movable stop into and out of its operative position in which it engages the stop member on the slide arresting the latter in a first position in which the delivery opening is partially closed, a platform assembly including a main platform connected with the scale beam and an auxiliary platform supporting the bags during filling, compression springs for resiliently supporting the auxiliary platform on the main platform, compressed by the weight of the bags, means operated by a predetermined weight of goods filled into the bags controlling the movement of the movable slide, said last named means including snap switches operated upon compression of the compression spring by the predetermined weight of goods filled into the bags, said snap switches controlling a solenoid, and said solenoid controlling the operation of the first compressed air operating means, urging the slide towards its closed position, until arrested in its first position, means for controlling the withdrawal of the movable stop member from its operating, slide arresting position, said means including photoelectric means controlled by the scale beam when balancing, said photoelectric means operating circuits connected with the electric control means of the second compressed air operated means to produce withdrawal of the slide arresting stop member to an inoperative position upon balancing of the scale beam, the slide upon withdrawal of the stop member being instantly moved by the means urging it into its second position of complete closure of the delivery opening.

7. A weighing scale as claimed in claim 2, wherein the solenoid controlled second compressed air operated means for moving the movable stop into and out of the path of the slide comprise a rotatable shaft for carrying the movable stop, an arm on said shaft, moved by the second compressed air operated piston, the second solenoid operated air valve for admitting air at one end of the second cylinder operating the piston within said second air operated cylinder, and moving the stop into an inoperative position, and resilient means for returning the stop to its operative position when the piston is not under air pressure.

References Cited in the file of this patent

UNITED STATES PATENTS

| | | |
|---|---|---|
| 666,615 | Hanak | Jan. 22, 1901 |
| 940,616 | Momig | Nov. 16, 1909 |
| 1,411,495 | Herman | Apr. 4, 1922 |
| 2,319,193 | Walter | May 11, 1943 |
| 2,351,606 | Gold et al. | June 20, 1944 |
| 2,398,887 | Drinnon | Apr. 23, 1946 |
| 2,634,080 | Knobel | Apr. 7, 1953 |
| 2,634,081 | Knobel | Apr. 7, 1953 |
| 2,634,082 | Knobel | Apr. 7, 1953 |
| 2,634,084 | McWaters | Apr. 7, 1953 |